United States Patent [19]
Rieber

[11] Patent Number: 5,595,667
[45] Date of Patent: Jan. 21, 1997

[54] LIQUID FILTRATION AND INCINERATION

[75] Inventor: Roy S. Rieber, Houston, Tex.

[73] Assignee: Enviroguard, Inc., Houston, Tex.

[21] Appl. No.: 311,565

[22] Filed: Sep. 23, 1994

Related U.S. Application Data

[63] Continuation-in-part of Ser. No. 142,484, Nov. 18, 1993, abandoned, which is a continuation-in-part of Ser. No. 702,832, May 20, 1991, abandoned.

[51] Int. Cl.⁶ ..................................................... B01D 37/02
[52] U.S. Cl. ............................................ 210/769; 210/777
[58] Field of Search .................................... 210/769, 779, 210/778, 193, 503

[56] References Cited

U.S. PATENT DOCUMENTS 3,978,199  8/1976  Maruhnic et al. ..................... 423/461
3,996,131  12/1976  Conn ..................................... 210/23 H
5,106,510  4/1992  Rieber ................................... 210/717

Primary Examiner—Frank Spear
Attorney, Agent, or Firm—James F. Weiler

[57] ABSTRACT

Disclosed is a filter aid or medium and a method of filtering liquid wastes having good filtration, good flow rates through the filter area, and heat value of the resulting filter cake containing the filtered solids of at least 5000 Btu per pound of filter aid. The filter aid comprises rubber particle sizes effective to filter solids of different sizes from the liquid, generally in a size range of from about 5 mesh to 325 mesh, alone or with up to about 70% silicious particles. Preferably a wetting agent is used for the filtration especially for water-based liquids.

15 Claims, No Drawings

LIQUID FILTRATION AND INCINERATION

CROSS REFERENCE TO RELATED APPLICATION

The present application is a continuation-in-part of application Ser. No. 08/142,484 filed Nov. 18, 1993, abandoned, which is a continuation-in-part of application Ser. No. 07/702,832 filed May 20, 1991, abandoned.

FIELD OF THE INVENTION

The present invention relates to filter aids or mediums for and methods of filtering liquids in which the resulting filter cake containing filtered solids qualifies as fuel for industrial boilers, furnaces and kilns under federal recycling regulations.

BACKGROUND OF THE INVENTION

Large quantities of liquids containing unfiltered particles, such as liquid waste, in the past have been discharged in the environment without filtration. Current federal and state regulations limit the discharge of such liquids and liquid wastes into the environment. U.S. Pat. No. 4,645,605 is directed to filtration of wastes to separate impurities from liquids or gases with biogenetic silica, such as rice hulls, which provides excellent filtration, but which has little heating value and in normal use does not qualify as fuel for industrial boilers, furnaces and kilns.

A number of filter mediums or filter aids have been proposed which when incinerated yield much less ash than the incineration of a conventional product. Some of these products also increase the heating value of the filter cake to a value greater than 5,000 Btu per pound of filter cake so that the filter cake can qualify as fuel for industrial boilers, furnaces and kilns under federal recycling regulations. These products, however, generally have poor filtration characteristics, are very expensive (1.5 to 2.0 times the cost of conventional filter aids) and yield filter cake which is lower in quality than those from conventional filter aids. It would be highly desirable to provide a filter aid which has very good filtration characteristics, good flow rates, which when incinerated produces a minimum amount of ash, raises the heating value of the filter cake to a value greater than 5,000 Btu per pound, and is low cost.

SUMMARY OF THE INVENTION

The present invention is directed to a filter aid and a method of filtering by which the above properties are obtained; that is, which has excellent filtration, good flow rates, of low cost, qualifies as a fuel for industrial boilers, furnaces and kilns, and which produces a minimum of ash.

The filter aid for filtering solids from liquids and liquid wastes comprises rubber particles having a size effective to filter solid particles of various sizes from the liquid as hereinafter set forth, alone, or admixed with up to about 70% by weight, and preferably from about 20% to about 70% by weight of silicious particles. The filter aid containing the filtered particles has sufficient heat value so that it can be qualified as a fuel as indicated above. Under current regulations, the resulting filter cake containing filtered particles is required to have a Btu content of at least 5000 per pound and preferably 6000 per pound or more of the filter cake containing the filtered solids to qualify as such a fuel. Preferably, the silicious particles are biogenetic silica, such as rice hull ash, however, other silica particles, such as diatomaceous earth and perlite can be used. Since the rubber particles are hydrophobic in filtering water based liquids, a wetting agent can be added, such as commercial detergents.

The method of the invention comprises flowing the liquid to be filtered through the filter aid which results in a filter cake containing the filtered particles, which filter cake has a Btu content of at least 5000 and, preferably, 6000 or more. The filter cake can then be incinerated as a fuel for an industrial furnace, boiler or kiln. Unexpectedly, by including the rubber particles in the mixture, the filtration flow is increased over that with just the silicious particles.

Accordingly, it is an object of the present invention to provide a filter aid having the aforementioned desirable properties.

It is a further object of the present invention to provide a method of filtration which has the aforementioned desirable properties.

A further object of the present invention is the provision of a filter aid for filtering liquids containing solid particles having rubber particles of a size effective to filter the solid particles from the liquid, the resulting filter cake containing the filtered particles having a heat value sufficient to be incinerated as a fuel for industrial boilers, furnaces, and kilns or, after incineration, having reduced ash.

It is a further object of the present invention to provide a filter aid for filtering liquids and liquid wastes which comprises rubber filtering particles, preferably having a mesh size effective to filter the size solid particles contained therein, alone, or admixed with up to about 70% by weight and preferably 20% to 75% by weight silicious particles, and in which the resulting filter cake containing the filtered solids has a heat value which when incinerated yields substantially less ash than would be produced if conventional silica based filter aids were used and/or which has sufficient heating value to qualify the filter cake for incineration as a fuel for industrial boilers, furnaces and kilns under federal recycling regulations.

A further object of the present invention is the provision of a method of filtering liquids and liquid waste, sludges and the like by flowing them through a filter aid comprised of rubber filtering particles preferably in a mesh size effective to filter the size solid particles contained therein, alone, or a mixture of such rubber particles and silicious particles to about 70% silicious particles by weight, and in which the resulting filter cake has a heating value which produces minimal ash when incinerated and/or increases the heating value of the filter cake so that the filter cake qualifies as a fuel for industrial boilers, furnaces and kilns under federal recycling regulations.

Other and further objects, features and advantages appear throughout the specification and claims.

DESCRIPTION OF PRESENTLY PREFERRED EMBODIMENTS

The present invention is directed to a filter aid or medium and a method of filtering with a filter aid which has good porosity, pore size sufficient to allow the desired material to pass through and prevent the undesirable material from passing through, does not readily compact, does not form a sticky mass, such as clay when wet, is dimensionally stable at the temperature and pressure range that the filtration occurs, and which forms a filter cake containing the filtered out material which produces minimal ash when incinerated and/or increases the heating value of the filter cake so that it will qualify as a fuel under federal recycling regulations.

This is accomplished by utilizing a filter aid comprising rubber particles having a particle size effective to filter solid particles from liquid, alone, or admixed with up to about 70% by weight, and preferably from about 20% to about 70% by weight of silicious particles of the filter aid.

In general, the optimal size range of the rubber particles is from about 20 mesh to about 30 mesh for most refinery and biological waste because this range matches well to most refinery and biological waste filtration problems where the native solids range in size from 5 to 100 microns. For liquids or liquid wastes where the native solids range in size from 100 to 1000 microns, the rubber size is most effective in the 6 to 10 mesh range. For liquids or liquid wastes with native solids in the 1 to 5 micron range, the size of the rubber particles is most effective in the 80 to 100 mesh. A general mesh size range of the rubber particles is from about 5 to 325; however, the effective range of particle sizes of the rubber is a function of the native solids in the filtration problem. By routine experimentation the appropriate mesh size of the rubber particles and the amount of silicious particles present, if any, can be determined for effective filtration based on the size of the solids in the liquid or liquid waste. As previously mentioned, however, rubber particle sizes outside the foregoing ranges may be present but contribute little if any filtration but do contribute to the Btu content of the resulting filter cake containing filtered solids.

The silicious particles preferably are biogenetic silica, such as rice hull ash or diatomaceous earth or perlite or mixtures thereof.

In utilizing biogenetic silica, plants having a highly porous silica structure are burned which contain a minimum of 15% silica by weight in its dry matter and preferably 20% or more. There are a limited number of such plants that contain these high quantities of silica. Essentially, these are the stalks and hulls of rice, equisetum (horsetail weeds), certain bamboos and palm leaves, particularly polymra, pollen and the like, all of which when burned leave a porous ash that is highly desirable as a filtration aid.

The presently preferred biogenetic silica is rice hull ash. Rice hulls are high in silica content, containing about 18 to 22% by weight, with the ash having a porous skeletal silica structure having approximately 75 to 80% open or void spaces by volume. In addition, it has been a continuing problem for the rice industry to dispose of rice hulls; and, while a number and variety of uses for rice hulls or rice hull ash have been proposed and used, large volumes of rice hulls are burned; and their ash is disposed by the rice industry as a waste material at great expense.

Biogenetic silica in amorphous state and in substantially porous form can be obtained either by burning or decomposition of the hulls.

Commercially available rice hull ash is prepared by burning rice hulls in a furnace. In the process, raw rice hulls are continually added to the top of the furnace and the ash is continuously removed from the bottom. Temperatures in the furnace range from 800° to about 1400° C., and the time factor for the ash in the furnace is about three minutes. Upon leaving the furnace, the ash is rapidly cooled to provide ease in handling. When treated by this method, silica remains in a relatively pure amorphous state rather than the crystalline forms known as tridymite or cristobalite. The transition from the amorphous to the crystalline state generally takes place when the silica is held at very high temperature, for example 2000° C., or longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the ash is in an amorphous state with a porous skeletal structure.

Biogenetic silica devoid of fiber is fire-retardant, inert, and is dimensionally stable at low and high temperatures, thus rendering it useful at elevated temperatures without structural change.

On a commercial burning of rice hulls as an energy source, the resultant ash had the following range of values in its chemical analysis (by weight):

Silica—92% to 96%

Moisture—less than 1% to 3%

Carbon—3.5% to 7.5%

The remaining ½% consists of minor amounts of magnesium, barium, potassium, iron, aluminum, calcium, copper, nickel, sodium, and magnesium.

The carbon content was in a dispersed state throughout the material. The carbon can be activated if the ash is treated with super heated steam under standard conditions. This treatment removes particles that clog the pores of the carbon thus enormously increasing the ability of the carbon to absorb gases.

If desired, of course, the rice hull ash can be burned until all of the carbon is removed. However, in many filtration processes, the presence of the carbon is highly advantageous.

Advantageously, the rubber particles used can be a waste material, such as what is referred to as "buff rubber." This is obtained by grinding of tire carcasses to provide a flat tire surface for a retread and grinding of new tires to finish them. Also, whole tires can be utilized in which the metal and cords are removed, such as by cryogenic processes which are utilized to separate out the metals, such as by a magnet, and the cord.

The rubber component of the mixture may require treatment with a wetting agent in order to defeat hydrophobic characteristics which are frequently found. The wetting agent prevents the rubber component from separating in the filtration stream thereby becoming ineffective, useless and in fact a problem. Many low cost and widely known wetting agents such as industrial soaps and detergents were found to be effective in a wide range of dosages from as little as 1% to as high as 10% and higher. In any event, the wetting agent addition imposed negligible cost to the product and had no deleterious effect on the filtration properties. The wetting agent is unnecessary in other than water based liquids, but can be included, if desired.

As previously mentioned, current governmental recycling regulations require a Btu content of the resulting filter cake of at least 5000 Btu per pound of filter cake. At the present time most recyclers insist on at least 6000 Btu's per pound of filter cake. The incineration is accomplished by using the filter cake as fuel in cement or lime kilns, industrial furnaces, and the like.

As previously mentioned, unexpectedly flowing liquid or liquid wastes through the filter aid exceeded the flow rate experienced with conventional filter aids, the retained solids fraction was equivalent to the retained solids using conventional products, and with refinery sludge retained solids were 40% drier, which is a very desirable quality.

The following examples illustrate the filter aid and method of filtering with the filter aid.

EXAMPLE 1

In this example liquids containing solids of different particle size were used as the filter feed. Each was filtered with 50% by weight rubber particles and 50% silicious particles, rice hull ash. The rubber particle size was 80 mesh and 50 mesh. The following Table 1 sets forth the results.

TABLE 1

| | Filter Feed Contaminant | | | |
|---|---|---|---|---|
| | AC Test Dust - Fine | | AC Test Dust - Coarse | |
| Crumb Rubber Size ↓ | Flux (gpm/sf) | Turb (NTU) | Flux (gpm/sf) | Turb (NTU) |
| 80 Mesh | 0.69 | 0.21 | 0.73 | 0.20 |
| 20 Mesh | 1.13 | 1.04 | 1.58 | 0.21 |

TABLE 1A

| Particle Size Distribution by Volume % | | |
|---|---|---|
| Size in Microns | Fine Grade % Less Than | Coarse Grade % Less Than |
| 5 | 39 ± 2 | 12 ± 2 |
| 10 | 57 ± 3 | 24 ± 3 |
| 20 | 73 ± 3 | 38 ± 3 |
| 40 | 91 ± 3 | 61 ± 3 |
| 80 | 100 | 91 ± 3 |
| 200 | | 100 |

From the above table, the liquid with Fine AC Test Dust was best filtered with the 80 mesh rubber. The 25 mesh rubber achieved higher flux but at the expense of clarity. The liquid with the Coarse AC Test dust is best filtered with the 25 mesh rubber. The turbidities were nearly identical but the flux was dramatically higher.

EXAMPLE 2

In this example the filter aid was a mixture comprised of 47.5% rice hull ash and 47.5% rubber particles by weight, the rubber particles having a size range of from about 20 mesh to about 30 mesh, and a 5.0% wetting agent consisting of a solution of 25% industrial detergent and 75% water by weight. This mixture was obtained by mixing 100 lbs. rice hull ash, 100 pounds rubber particles and 10 lb. detergent solution (total of 210 lbs.). This filter aid, identified as mfLA, was compared to three commercial filter aids, which were, Conoco Burnaway, Alar BTU-Plus, and diatomaceous earth as to flow rate (flux), total solids filtered in percent (TS) and the heating value of the resulting filter cake in Btu. The results are set forth in the following Table 2.

TABLE 2

| | | Flux (*) | | TS () | | Heat Value (*) | |
|---|---|---|---|---|---|---|---|
| | x | x | mFLA | x | mFLA | x | mFLA |
| Chemical Plant, Silver Recovery | A | 0.91 | 2.04 | 70 | 58 | 10,840 | 7,120 |
| | B | 1.64 | 2.04 | 50 | 58 | 6,180 | 7,120 |
| Refinery, API Sludge | C | 0.10 | 0.12 | 52 | 68 | 1,400 | 6,750 |
| Chemical Plant, Biological Sludge | A | 0.41 | 1.24 | 38 | 50 | 5,540 | 5,010 |
| | B | 0.61 | 1.24 | 46 | 50 | 5,010 | 5,010 |

Brand x Legend:
A = Conoco Burnaway
B = Alar BTU-Plus
C = Diatomaceous earth
Notes:
(*) Flux: Gallon per minute per square foot of filter area. The bigger the number, the faster the rate of flow through the filter.
(**) TS: Total solids in percent. The larger the number, the drier the filter cake. Bigger is better.
(***) Heating Value = The heating value of the filter cake in Btu per pound.

The results in the foregoing table demonstrate that the filter aid of the present invention had increased flow rates through the filter area. Further, the heating value of the filter cake resulting from using the present invention is in all cases above the government mandated 6,000 Btu per pound and in most cases above the heating value of the other filter aids. Lastly, the total solids (TS) of the filter cake are considered a good measure of the effectiveness of the filter aim, are higher for the filter aid of the present invention than for the other media in all cases except one.

EXAMPLE 3

In this example the filter aid of the present invention was the same as that in Examples 1 and 2 except that the silicious particles and the rubber particles varied from about 20% to about 75% by weight of rubber particles. Good filtration and flow rates were obtained and the resulting filter cake containing the filtered material had a heating value in excess of 5000 Btu per pound of filter cake.

EXAMPLE 4

In this example the filter aid of the present invention was the same as that of Examples 2 and 3 except that the mesh size of the rubber particles were in the range of 5 to 325 which produced satisfactory results.

EXAMPLE 5

In this example, other biogenetic silica particles were substituted for rice hull ash in the preceding examples. These include the ash from stalks and hulls of rice, equisetum, bamboos and palm leaves, which when burned provide pores that are highly desirable as filtration aid. Satisfactory results were obtained by such substitution.

EXAMPLE 6

In this example, diatomaceous earth or perlite and mixtures thereof were substituted for the rice hull ash of the preceding examples and each provides satisfactory results. That is, the filtration of solids was obtained, the flow rates were good, and the resulting filter cake containing the filtered solids had sufficient heat value to be incinerated as fuel for industrial boilers, furnaces and kilns.

EXAMPLE 7

In this example, the wetting agent was eliminated for non-water based liquids, such as organic liquids in the filter aids of the preceding examples with satisfactory results.

EXAMPLE 8

In this example, the filter aid was rubber particles in a range of about 20 mesh to about 30 mesh, alone, and admixed with a wetting agent consisting of a solution of 25% industrial detergent and 75% water by weight. Both of these filter aids were compared to the following commercial filter aids. Alar Btu Plus and diatomaceous earth, Celite Corp., Grade 545. The results are set forth in the following Tables 2A and 2B.

TABLE 2A

Filter Aid Comparison
Filtration of Machine Tool Coolant oil

|  | Add Rate* ppm | Flux** gpm/sf | Filt Cake# TS, % | Filt Turb## NTU |
|---|---|---|---|---|
| Crumb Rubber without wetting agent | 80 | 2.34 | 68 | 0.92 |
| Crumb Rubber with wetting agent | 80 | 2.38 | 67 | 0.89 |
| Alar Btu Plus | 80 | 1.91 | 51 | 11 |
| Diatomaceous Earth, Celite Corp., Grade 545 | 80 | 2.16 | 44 | 0.61 |

TABLE 2B

Filter Aid Comparison
Filtration of Synthetic Machine Tool Coolant (Water Based)

|  | Add Rate* ppm | Flux** gpm/sf | Filt Cake# TS, % | Filt Turb## NTU |
|---|---|---|---|---|
| Crumb Rubber - with wetting agent | 50 | 3.16 | 71 | 0.13 |
| Alar Btu Plus | 50 | 1.22 | 43 | 0.64 |
| Diatomaceous Earth, Celite Corp., Grade 545 | 50 | 3.28 | 64 | 0.08 |

(*) Add Rate is the amount in parts per million, on a weight basin, of filter aid that is added to the contaminated liquid prior to pumping it to the filter.
(**) Flux is a measure of the rate at which the contaminated liquid treated with the filter aid can be pumped through the filter. Flux is reported in gallons per minute per square foot of filter area (gpm/sf). For example, a filter having two square feet of filter area using an aid of the present invention added at the rate of 80 parts per million can filter the contaminated liquid at the rate of 4.68 gallons per minute.
(#) Filter Cake TS, % is a measure of the dryness of the filter cake at the conclusion of the filtration process. The dryer the filter cake, the larger the TS, the better.
(##) Filtrate Turbidity in NTU or nephlo turbidity units. The smaller the number the less turbid the filtrate, the better.

The results of the foregoing Tables 2A and 2B demonstrate the advantages of using crumb rubber alone or admixed with a wetting agent. In all cases, the heating value of the filter cake was about 6,000 Btu per pound.

Any desired wetting agent can be used, many of which are commercially available.

The present invention therefore is well suited and adapted to attain the objects and ends and has the advantages mentioned as well as others inherent therein.

While presently preferred embodiments of the invention have been given for the purpose of disclosure, changes may be made therein and other applications may be made thereof which are within the spirit of the invention as defined by the scope of the appended claims.

What is claimed is:

1. A filter aid comprising, solid rubber particles having a size effective to filter solid particles contained in a liquid from the liquid on flow of the liquid through the filter aid resulting in a filter cake comprised of the solid rubber particles and containing the solid particles filtered from the liquid, the filter cake having a heat value sufficient to be incinerated as a fuel for industrial boilers, furnaces, and kilns, the rubber particles being substantially uncompactable and dimensionally stable at temperature and pressure ranges at which filtration of the solid particles occurs, the liquid flowing through the filter aid being free of the rubber particles and the solid particles filtered from the liquid.

2. A filter aid as claimed in claim 1 wherein, the rubber particles have a size of from about 5 mesh to about 325 mesh.

3. The filter aid of claim 1 including, a wetting agent.

4. The filter aid of claim 1 wherein, the resulting filter cake containing the filtered solid particles has a Btu content of at least 5000 Btu per pound of filter cake.

5. A filter aid comprising, solid rubber particles and 20% to 75% by weight of silicious particles, the solid rubber and silicious particles having a size effective to filter solid particles contained in a liquid on flow of the liquid through the filter aid, the rubber particles being substantially uncompactable and dimensionally stable at temperature and pressure ranges at which filtration of the solid particles occurs, the resulting filter cake comprised of the rubber particles and silicious particles and containing the filtered solid particles having a heat value sufficient to be incinerated as a fuel for industrial boilers, furnaces, and kilns and, after incineration, having reduced ash, the liquid flowing through the filter aid being free of the rubber particles and the solid particles filtered from the liquid.

6. The filter aid of claim 4 wherein, the silicious particles are rice hull ash.

7. The filter aid of claim 5 wherein, the silicious particles are diatomaceous earth.

8. The filter aid of claim 5 wherein, the silicious particles are perlite.

9. A method of filtering a liquid containing solid particles comprising, flowing the liquid through a filter aid comprised of solid rubber particles effective to filter the solid particles from the liquid on flow of the liquid therethrough forming a filter cake of rubber particles containing the solid rubber particles and the solid particles filtered from the liquid, the rubber particles being substantially uncompactable and dimensionally stable at temperature and pressure ranges at which filtration of the solid particles occurs, the resulting filter cake containing the solid rubber particles and the filtered solid particles having a heat value sufficient to be incinerated as a fuel for industrial boilers, furnaces, and kilns, the liquid flowing through the filter aid being free of the rubber particles and the solid particles filtered from the liquid.

10. The method of claim 9 wherein, the filter aid includes a wetting agent.

11. The method of claim 9 wherein, the resulting filter cake containing the filtered solid particles has a Btu content of at least 5000 Btu per pound of filter cake.

12. A method of filtering a liquid containing solid particles comprising, flowing the liquid through a filter aid comprised of solid rubber particles and 20% to 75% by weight of silicious particles, the rubber particles being substantially uncompactable and dimensionally stable at temperature and pressure ranges at which filtration of the solid particles occurs, the rubber particles and the silicious particles effective to filter the solid particles on flow of the liquid through the filter aid, the resulting filter cake containing the solid rubber particles, the silicious particles, and the filtered solid particles having a sufficient heat value to be incinerated as a fuel for industrial boilers, furnaces, and kilns and, after incineration, having reduced ash, the liquid flowing through the filter aid being free of the rubber particles and the solid particles filtered from the liquid.

13. The method of claim 12 wherein, the silicious particles are rice hull ash.

14. The method of claim 12 wherein, the silicious particles are diatomaceous earth.

15. The method of claim 12 wherein, the silicious particles are perlite.

* * * * *

UNITED STATES PATENT AND TRADEMARK OFFICE
CERTIFICATE OF CORRECTION

PATENT NO : 5,595,667
DATED : January 21, 1997
INVENTOR(S): Roy S. Rieber

It is certified that error appears in the above-identified patent and that said Letters Patent are hereby corrected as shown below:

Column 8, line 48, "The filter aid of claim 4" should read -- The filter aid of claim 5 --.

Signed and Sealed this

First Day of May, 2001

*Attest:*

NICHOLAS P. GODICI

*Attesting Officer*   *Acting Director of the United States Patent and Trademark Office*